US010637734B2

(12) United States Patent
Fernando et al.

(10) Patent No.: US 10,637,734 B2
(45) Date of Patent: Apr. 28, 2020

(54) TECHNIQUES FOR ADAPTIVELY AND SELECTIVELY PROTECTING CONTROL PLANE OF COMMUNICATIONS NETWORK (71) Applicant: CISCO TECHNOLOGY, INC., San Jose, CA (US)

(72) Inventors: Rex Emmanuel Fernando, Dublin, CA (US); Balaji Sundararajan, Fremont, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 15/610,475

(22) Filed: May 31, 2017

(65) Prior Publication Data
US 2018/0351810 A1    Dec. 6, 2018

(51) Int. Cl.
H04L 12/24        (2006.01)
H04L 12/825       (2013.01)
(Continued)

(52) U.S. Cl.
CPC .......... H04L 41/0896 (2013.01); H04L 47/11 (2013.01); H04L 47/12 (2013.01);
(Continued)

(58) Field of Classification Search
CPC ... H04L 41/0896; H04L 47/11; H04L 69/163; H04L 47/25; H04L 49/355; H04L 47/115; H04L 47/93; H04W 28/12; H04W 28/10
(Continued)

(56) References Cited

U.S. PATENT DOCUMENTS 6,118,791 A  *  9/2000  Fichou .................... H04L 45/02
                                                                                    370/468
8,654,638 B2    2/2014  Godlewski
(Continued)

FOREIGN PATENT DOCUMENTS

CN        101360046 B  *  2/2011

OTHER PUBLICATIONS

International Search Report and Written Opinion in counterpart International Application No. PCT/US2018/034281, dated Sep. 7, 2018, 13 pages.
(Continued)

Primary Examiner — Jeffrey M Rutkowski
Assistant Examiner — Sudesh M Patidar (57) ABSTRACT A method is described that includes receiving at a network element a transmission control protocol ("TCP") packet with TCP options set on a link between a controller and a destination node. If the network element comprises a transit node, the method includes comparing a bandwidth value indicated in a TCP options field of the received TCP packet with an outgoing link bandwidth of the network element. If the bandwidth value indicated in the TCP options field is greater than the outgoing link bandwidth of the network element, the method includes updating the bandwidth value in the TCP options field to be equal to the outgoing link bandwidth of the network element, and forwarding the packet to a next network element. If the bandwidth value indicated in the TCP options field is not greater than the outgoing link bandwidth, the bandwidth value in the TCP options field is not changed.

20 Claims, 6 Drawing Sheets (51) Int. Cl.
*H04L 12/801* (2013.01)
*H04L 12/931* (2013.01)
*H04L 29/06* (2006.01)

(52) U.S. Cl.
CPC .............. *H04L 47/25* (2013.01); *H04L 47/26* (2013.01); *H04L 47/263* (2013.01); *H04L 47/35* (2013.01); *H04L 49/355* (2013.01); *H04L 69/163* (2013.01)

(58) Field of Classification Search
USPC ........................................................ 370/235
See application file for complete search history.

(56) References Cited

U.S. PATENT DOCUMENTS

| | | | |
|---|---|---|---|
| 9,013,995 | B2 | 4/2015 | Beheshti-Zavareh et al. |
| 9,432,874 | B2 | 8/2016 | Rácz et al. |
| 2006/0280168 | A1* | 12/2006 | Ozaki ..................... H04L 47/11 370/352 |
| 2009/0046717 | A1* | 2/2009 | Li .......................... H04L 69/16 370/392 |
| 2015/0127805 | A1 | 5/2015 | Htay et al. |
| 2016/0218943 | A1 | 7/2016 | Djukic et al. |
| 2017/0257319 | A1* | 9/2017 | Roch ....................... H04L 47/12 |

OTHER PUBLICATIONS

Mario Gerla, et al., "Generalized Window Advertising for TCP Congestion Control", Communication Networks, European Transactions on Telecommunications, vol. 13, No. 6, Nov. 2002, XP055503029, ISSN: 1124-318X, DOI: 10.1002/ett.4460130602, 14 pages.

Marcos Talau, et al., "Available Network Bandwidth Schema to Improve Performance in TCP Protocols", International Journal of Computer Networks & Communications (IJCNC), vol. 5, No. 5, Sep. 2013, XP055503033, ISSN: 0975-2293, DOI: 10.5121/ijcnc.2013.5504, 13 pages.

Martin Suchara, et al., "TCP MaxNet—Implementation and Experiments on the WAN in Lab", XP055503035, IEEE Proceedings of the 9th International Conference on Networks, Oct. 10-12, 2001, vol. 2, Jan. 31, 2005, pp. 901-906, XP055503035, ISSN: 1531-2216, DOI: 10.1109/ICON.2005.1635637, ISBN: 978-0-7695-1187-0, 6 pages.

* cited by examiner

TECHNIQUES FOR ADAPTIVELY AND SELECTIVELY PROTECTING CONTROL PLANE OF COMMUNICATIONS NETWORK

TECHNICAL FIELD

This disclosure relates in general to the field of communications networks and, more particularly, to techniques for adaptively and selectively protecting the control plane of a communications network, such as a software defined network ("SDN"), with coloring mechanism using Transmission Control Protocol ("TCP") options.

BACKGROUND

Software-defined networking ("SDN") is an approach to computer networking aimed at allowing network engineers and administrators to respond quickly to changing network requirements. Using SDN, a network administrator can initialize, control, change, and manage network behavior from a centralized control console without having to touch individual switches, and can deliver services to wherever they are needed in the network, without regard to what specific devices a server or other hardware components are connected. A key component of SDN is separation of the system that makes decisions about where and how traffic is sent (i.e., the control plane, or SDN controller) from the underlying devices that forward traffic to the intended destination (i.e., the data plane).

Currently, the bandwidth designated for control plane communications between the SDN controller and a network device for purposes of monitoring and configuration is based on what the controller requests from the network device. For example, if the SDN controller asks a network device to enable monitoring including Syslog, netflow, and device profiling, neither the device nor the controller takes into account the network conditions. Instead, attempts are made to simply push as much data across the control channel as possible.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is described and in some embodiments includes receiving at a network element a transmission control protocol ("TCP") packet with TCP options set on a link between a controller and a destination node; if the network element comprises a transit node, comparing a bandwidth value indicated in a TCP options field of the received TCP packet with an outgoing link bandwidth of the network element; if the bandwidth value indicated in the TCP options field is greater than the outgoing link bandwidth of the network element, updating the bandwidth value indicated in the TCP options field to be equal to the outgoing link bandwidth of the network element; and forwarding the TCP packet to a next network element. The method may also include, if the bandwidth value indicated in the TCP options field is not greater than the outgoing link bandwidth of the network element, refraining from changing the bandwidth value indicated in the TCP options field.

In certain embodiments, the method includes, if the network element is designated as a controller, setting at the controller a maximum end-to-end bandwidth for the link to the bandwidth value indicated the TCP options field of the TCP packet. The method may also include setting at the destination node a maximum end-to-end bandwidth for the link to the bandwidth value indicated in the TCP options field of the TCP packet; and sending toward the controller along the link a new TCP packet with TCP options set and having a bandwidth value indicated in a TCP options field set to equal to an outgoing link bandwidth of the network element.

In additional embodiments, the maximum end-to-end value is used by the controller to determine how much control data may be sent on the link without monopolizing the link. Moreover, the network element may include at least one of a router and a switch. The method may further include, in certain embodiments, updating the bandwidth value indicated in the TCP options field if congestion is detected on an interface of the network element. In some embodiments, wherein the link is a control plane link.

Example Embodiments

Originally, SDN focused primarily on separation of the network control plane from the network data plane. When a packet arrives at a switch in an SDN network, rules built into the switch dictate where the packet is forwarded; the switch sends all packets destined for the same destination along the same path and treats all of the packets exactly the same. In a classic SDN scenario, rules for packet handling are sent by the controller to the switches, or data plane devices, and the switches query the controller for guidance as needed and provide the controller with information regarding the traffic they are handling.

Figure 1:
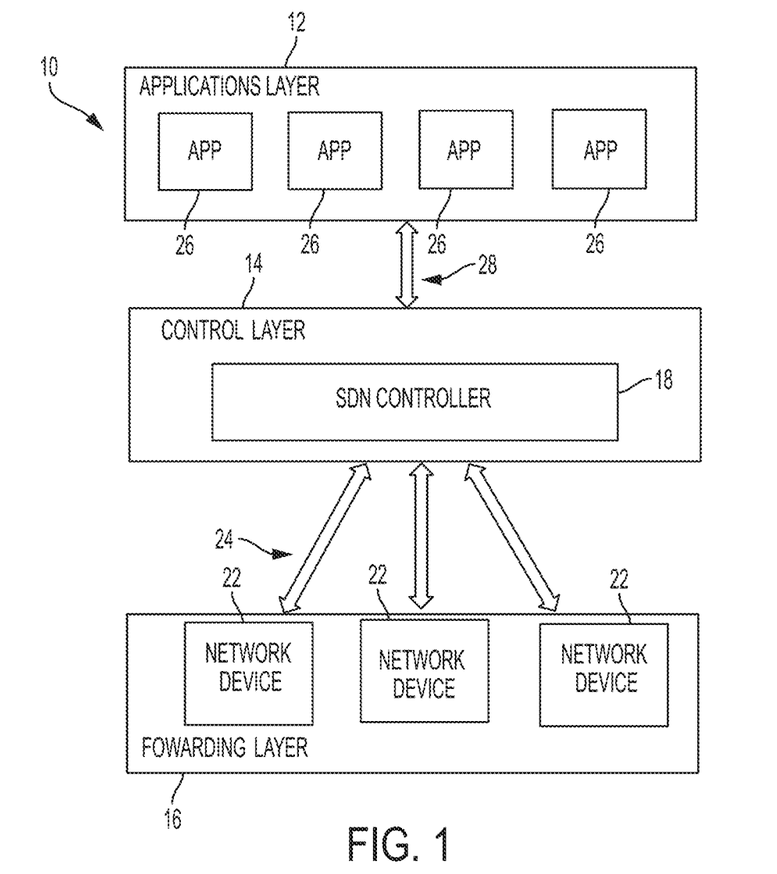
FIG. 1 illustrates a simplified block diagram of an SDN for implementing techniques for adaptively and selectively protecting the control plane of a communications network using TCP options in accordance with embodiments described herein.

FIG. 1 illustrates a simplified block diagram of an example SDN 10 in accordance with embodiments described herein. As shown in FIG. 1, the SDN 10 includes an application layer 12, a control layer 14, and a forwarding (or infrastructure) layer 16. The control layer 14 includes an SDN controller (or simply "controller") 18 comprising SDN control software for implementing a control plane for providing a variety of network services. The infrastructure layer 16 includes one or more network devices 22, one or more of which may be implemented as switching devices, each of which implements a data plane and communicates with the controller 18 through the controller's south-bound interface ("SBI"), or control and data plane interface, 24 using Open Flow or some other communications protocol.

Instead of deploying a firewall or load balancer, as might be used in a traditional network, SDN 10 deploys one or more business applications 26 in the application layer 12, one or more of which may interact with the controller 18 to manage data plane behavior. Applications 26 communicate with the controller 18 through the controller's north-bound interface ("NBI"), or application program interface ("API"), 28.

Applications 26 include software instructions that explicitly and directly communicate their network requirements and desired network behavior to the SDN controller 18 via API 28. Applications 26 may also consume an abstracted view of the SDN 10 for internal decision-making. Applications 26 include application logic and one or more interface drivers and in certain embodiments may expose another layer of abstracted network control.

The controller 18 is a logically centralized entity that performs a variety of functions for the SDN 10, including translating the requirements from the application layer 12 to the forwarding layer 16 and providing the applications 26 with an abstract view (e.g., statistics and events) of the SDN 10. The controller 18 may include one or more NBI agents, SDN control logic, and a SBI driver. Designation of the controller 18 as "logically centralized" does not dictate such implementation details as federation of multiple controllers, hierarchical connection of controllers, communication interfaces between controllers, or virtualization/slicing of network resources.

Each of the network devices 22 is a logical network device that exposes visibility and uncontested control over its advertised forwarding and data processing capabilities. The logical representation of a network device may encompass all or some subset of the resources of the physical device on which it resides. Each of the network devices 22 may include an SBI agent, one or more traffic forwarding engines, and one or more traffic processing engines. The functions executed by the traffic forwarding and processing engines may include simple forwarding between the device's external interfaces and/or internal traffic processing or termination functions. One or more of the network devices 22 may be deployed on a single (physical) network element that includes an integrated physical combination of communications resources, managed as a unit. A network device may also be defined across multiple physical network elements. This logical definition neither prescribes nor precludes implementation details such as the logical to physical mapping, management of shared physical resources, virtualization/slicing of the network device, interoperability with non-SDN networking, nor the data processing functionality, which can include OSI layer 4-7 functionality.

The SBI 24 is the interface defined between the controller 18 and network devices 16 and may provide programmatic control of forwarding operations, capabilities advertisement, statistics reporting, and/or event notification. An advantage of SDN lies in the fact that the SBI 24 and NBI 28 are expected to be implemented in an open, vendor-neutral and interoperable manner.

In SDN, a network administrator can change the rules implemented by any network device whenever necessary, prioritizing, de-prioritizing, and/or blocking specific types of packets at a highly granular level of control. This is especially helpful in multi-tenant cloud computing environments because it enables the administrator to manage traffic loads in a flexible and highly efficient manner by effectively allowing the administrator to implement the network using less expensive commodity switches while maintaining more control over network traffic flow than previously possible.

In accordance with features of embodiments described herein, a TCP option field in a TCP packet conveyed between a network device and an SDN controller is used to determine the maximum available bandwidth between the controller and the network device. A proportion of the determined maximum available bandwidth is used for control channel communication; in other words, embodiments adaptively scale down (or scale up) bandwidth usage based on end-to-end bandwidth between the network device and the controller. Other monitoring data passing through the network device is inspected for TCP option sent and this information may be used to adaptively increase or decrease the bandwidth used. Color in the TCP options is used to depict the path that the flow traverses. Color is also used to reduce the amount of monitoring traffic across the network by adaptively deciding on what to send. For example, if the bandwidth is small then only crucial monitoring data is sent and all other (less important) data is suppressed or postponed. As used herein, "coloring" means marking the packets with information; in embodiments described herein, packets are "colored" using the TCP options field.

TCP takes data from a data stream, divides it into chunks, and adds a TCP header to create a TCP segment. The TCP segment is then encapsulated into an Internet Protocol ("IP") datagram and exchanged with peers. A TCP segment consists of a segment header and a data section. The segment header includes ten mandatory fields and an optional extension field. The data section follows the segment header and contains the payload data carried for the application. The length of the data section is not specified in the TCP segment header and can be calculated by subtracting the combined length of the TCP header and the encapsulating IP header from the total IP datagram length, as specified in the IP header.

Figure 2:
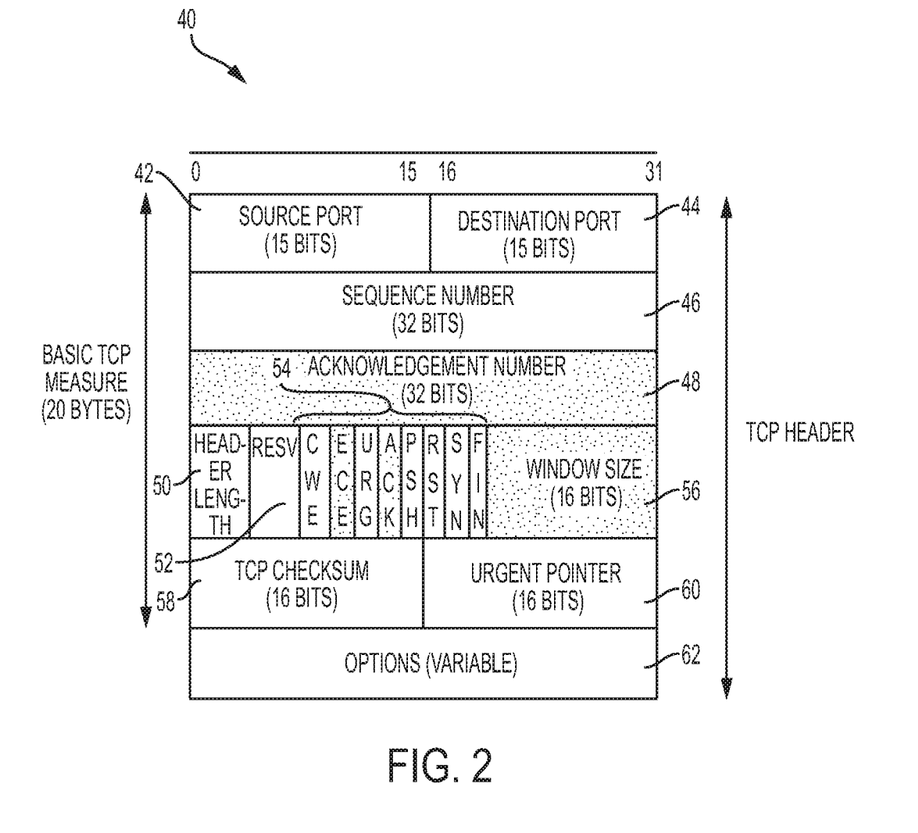
FIG. 2 illustrates a format of TCP header for use in implementing techniques for adaptively and selectively protecting the control plane of a communications network using TCP options in accordance with embodiments described herein.

An embodiment of a TCP header is illustrated in FIG. 2 and designated by reference numeral 40. As shown in FIG. 2, the TCP header 40 includes a source port field 42, a destination port field 44, a sequence number field 46, an acknowledgement number field 48, a header length field 50, a reserved field 52, a number of flags 54, a window size field 56, a TCP checksum field 58, an urgent pointer 60, and an options field 62.

In accordance with features of embodiments described herein, the options field 62 of the TCP header 40 is used to adaptively determine what and when to send control channel communications, such as monitoring and configuration information. This is used for the control plane information transmitted between the controller and network devices. The TCP options field 62 has the following characteristics. First, the header length field 50 indicates the length of the options field 62. Additionally, the TCP header is 20 bytes without the options field 62 or a maximum of 60 bytes with the options field. Finally, the options field is zero padded to make the header 40 a multiple of four bytes.

Figure 3:
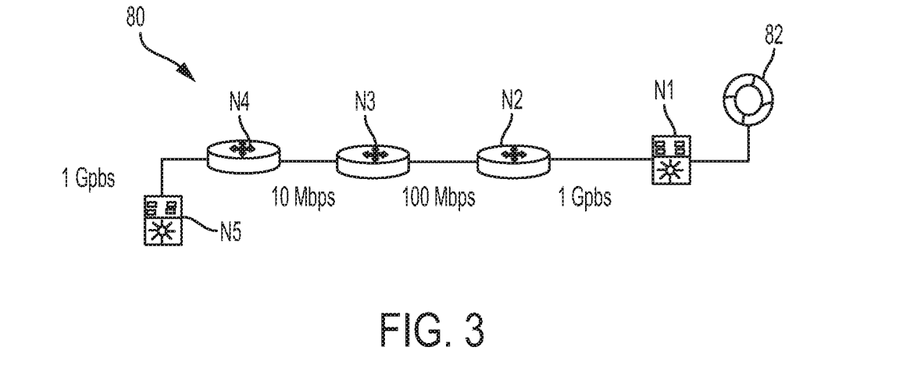
FIG. 3 illustrates a simplified block diagram of another SDN for implementing techniques for adaptively and selectively protecting the control plane of a communications network using TCP options in accordance with embodiments described herein.

FIG. 3 illustrates an SDN 80 for implementing aspects of embodiments described herein for. As shown in FIG. 3, the SDN 80 includes a controller 82 and a plurality of network devices, represented in FIG. 3 by network devices N1-N5. As shown in FIG. 3, a 1 Gbps connection exists between network devices N1 and N2, a 100 Mbps connection exists between network devices N2 and N3, a 10 Mbps connection exists between network devices N3 and N4, and a 1 Gbps connection exists between network devices N4 and N5. In accordance with features of embodiments described herein, the controller 82 makes a control channel connection between itself and network device N5. Controller 82 then sends a TCP packet with TCP_OPTIONS set and the bandwidth set to 1 Gbps in the TCP options field 62 (FIG. 2). When network device N2 receives the TCP packet, it observes that the bandwidth indicated in the options field is set to 1 Gbps but the outgoing link bandwidth is 100 Mbps, which is less than 1 Gbps. In response, network device N2 updates the options field to indicate a bandwidth of 100 Mbps and forwards the updated TCP packet to network device N3. When network device N3 receives the packet, it observes that the bandwidth in the options field is set to 100 Mbps and that the outgoing interface bandwidth is 10 Mbps. In response, the network device N3 updates the options field to indicate a bandwidth of 10 Mbps and forwards the updated TCP packet to network device N4.

When network device N4 receives the TCP packet, it observes that the bandwidth in the options field is set to 10 Mbps and that the outgoing interface bandwidth is 1 Gbps. Since 1 Gbps is not less than 10 Mbps, network device N4 does not change the bandwidth as indicated in the options field and forwards the TCP packet to network device N5. Upon receipt of the packet, network device N5, which is the destination, observes that the bandwidth as indicated in the option field is 10 Mbps. In response, network device N5 sets the MAX_BANDWIDTH to the controller to be 10 Mbps. Based on configuration information from the controller, only a portion of that bandwidth will be used for control channel communications. This process is also performed in the reverse order for each of the network devices so that the controller is aware of the maximum available end-to-end bandwidth with respect to each such device. In certain embodiments, network device N5 sends a TCP packet with TCP options set and the bandwidth set to 1 Gbps in the TCP options field destined for the controller. As previously indicated, the process described above is repeated at each transit node until the TCP packet is received by the controller, which sets the maximum end-to-end bandwidth for the link to the value indicated in the TCP options field of the received packet.

Figure 4:
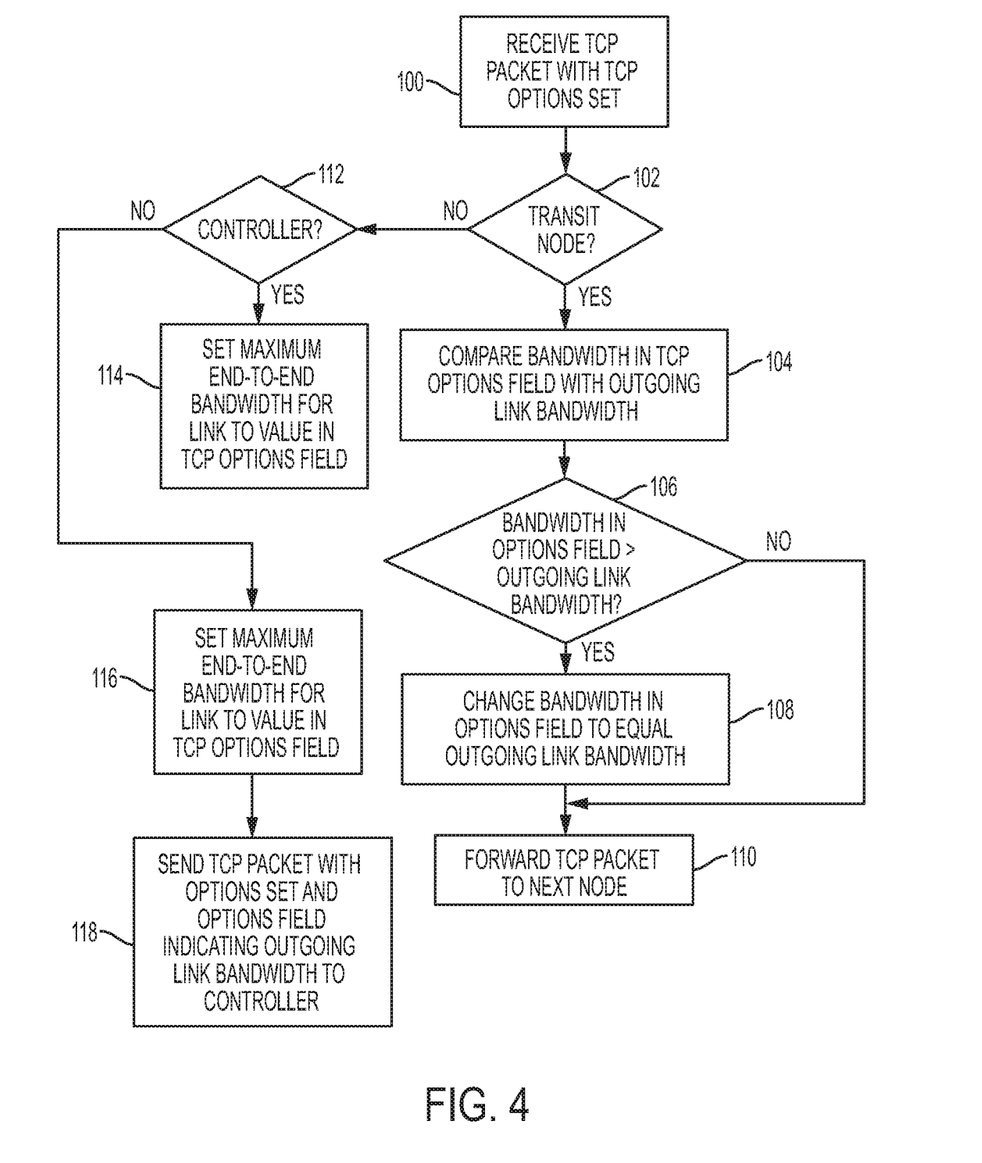
FIG. 4 illustrates a flowchart showing example steps of a technique for adaptively and selectively protecting the control plane of a communications network using TCP options in accordance with embodiments described herein.

FIG. 4 is a flowchart illustrating steps that may be performed by each SDN node in implementing techniques described herein for adaptively and selectively protecting the control plane of networks using TCP options. Referring to FIG. 4, in step 100, a TCP packet with TCP options set is received at the SDN node. In step 102, a determination is made whether the SDN node is a transit node. If the node is determined to be a transit node, in step 104, the bandwidth indicated in the TCP options field of the received TCP packet is compared to the node's outgoing link bandwidth. In step 106, a determination is made whether the bandwidth indicated in the TCP options field is greater than the outgoing link bandwidth. If a positive determination is made in step 106, execution proceeds to step 108, in which the TCP options field is updated to be equal to the outgoing link bandwidth. Execution then proceeds to step 110. If a negative determination is made in step 106, execution proceeds directly to step 110. In step 110, the TCP packet is forwarded to the next node.

If in step 102, a determination is made that the current node is not a transit node, execution proceeds to step 112, in which a determination is made whether the node is a controller. If it is determined that the node is a controller, execution proceeds to step 114, in which the node sets the maximum end-to-end bandwidth for the link to the value indicated in the TCP options field. If a determination is made in step 112 that the node is not a controller, execution proceeds to step 116, in which the node sets the maximum end-to-end bandwidth for the link to the value indicated in the TCP options field, and then to step 118, in which a TCP packet with options set and in which the maximum bandwidth is set to 1 Gbps is sent along the link to the controller.

The destination network element and the controller use the portion of the bandwidth received to exchange control plane information therebetween. In this manner, embodiments described herein ensure that the network is not overwhelmed with control plane information; rather, only a portion of the maximum end-to-end bandwidth (rather than a portion of the maximum total bandwidth) is used for sending control plane information.

In cases in which congestion is incurred, embodiments described herein may also assist in the indication of end-to-end congestion. Intermediate nodes can update in the TCP option field if congestion is occurring on any interface. Based on this, the control plane rate can be adjusted by the controller and devices. This is important because control plane communications are marked "high priority" and may starve out normal data communications if not properly regulated.

Embodiments described herein adaptively and selectively protect control plane of networks to provide end-to-end signaling of bandwidth between a controller and a network device and end-to-end congestion indication, thus removing cases in which the control plane can entirely starve data traffic. Knowing the end-to-end maximum bandwidth enables the control plane to selectively send control plane information, while suppressing low value information. The control plane data (for example, netflow) can be tagged with color of branch and WAN (dual color) for use in optimizing control plane information. For example, a branch WAN router can send netflow data with color of {LAN, WAN}. This helps avoid duplicate control plane information. In general, when enabling netflow on devices leads to duplicate netflow records, by marking, or coloring, the netflow data exported by the network elements can be marked. For example, a WNA router may mark data with {LAN, WAN}, whereas an access switch may mark data with {LAN}. The netflow collector can use this information to de-duplicate netflow records received from multiple sources. In cases in which congestion is incurred, the TCP options field can also help in indicating end-to-end congestion in the same manner described herein.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 5:
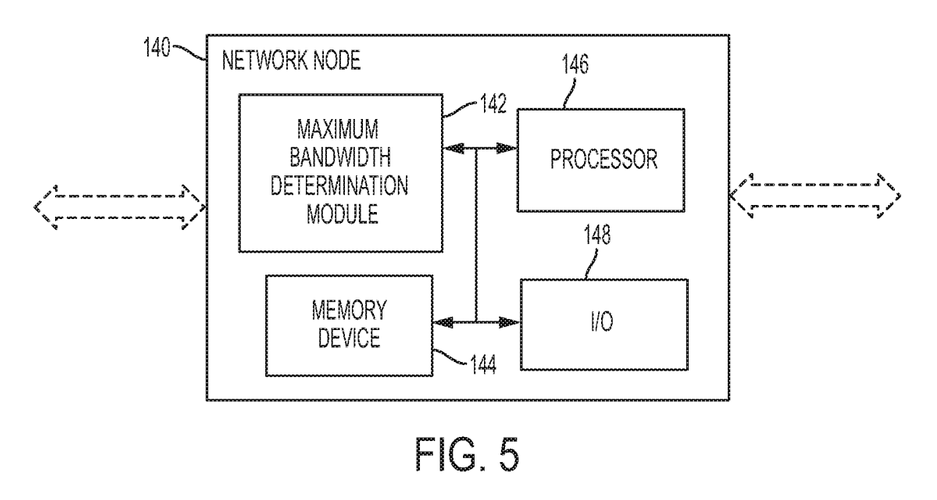
FIG. 5 is a simplified block diagram of an SDN node configured for implementing techniques for adaptively and selectively protecting the control plane of a communications network using TCP options in accordance with embodiments described herein.

For example, referring to FIG. 5, an SDN node 140, which may be implemented as a switch, a router, or a controller, may include a maximum bandwidth determination module 142 comprising software embodied in one or more tangible media for facilitating the activities described herein. In particular, the module 142 may comprise software for facilitating the processes illustrated in and described with reference to FIG. 4. The node 140 may also include a memory device 144 for storing information to be used in achieving the functions as outlined herein. Additionally, the node 140 may include a processor 146 that is capable of executing software or an algorithm (such as embodied in module 142) to perform the functions as discussed in this Specification. The node 140 may also include various I/O 148 necessary for performing functions described herein.

A goal to be achieved in connection with embodiments described herein is to have a single secure session for both the configuration and monitoring data and to use Netconf/yang to deliver this to devices and hence the underlying connection becomes a TCP connection. Existing TCP congestion mechanisms (for example, sliding window protocol) is based on the dropping of datagrams instead of actual bandwidth utilization. As far as the convergence of algorithm is concerned, this is equal to "round-trip-time+processing delay." In most of today's networks, this number needs to be less than 100 ms.

It will be recognized that in embodiments described herein, both the controller and network elements are communicating out-of-band and the unidirectional bandwidth discover is stitched using the out-of-band communication between the controller and network element so that both sides are known. The controller knows about routing information in the network and whenever the routing changes, it sends a new TCP discovery message toward the network element, which will lead to a reciprocating message by the network element, enabling both ends to discover the maximum bandwidth along the link. TCP packets are exchanged periodically (e.g., at a configurable interval) and/or in response to a change in topology/routing information as detected by the controller. Any of these events will lead to renegotiation of ingress and egress bandwidth as described above.

Figure 6:
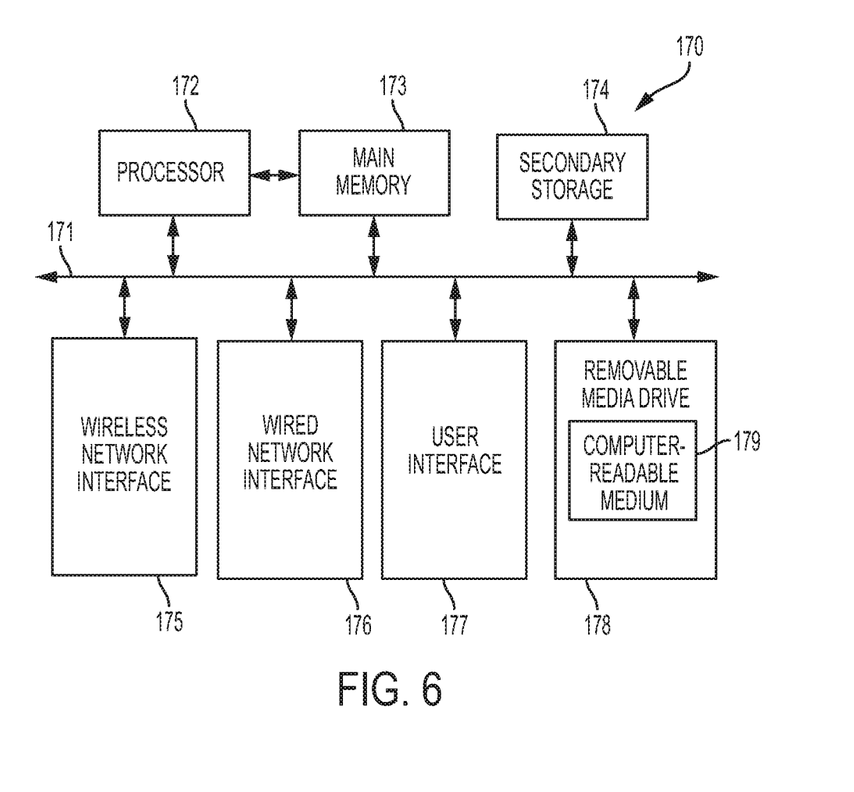
FIG. 6 is a simplified block diagram of a machine comprising an element of a communications network in which techniques for implementing techniques for adaptively and selectively protecting the control plane of a communications network using TCP options in accordance with embodiments described herein.

Turning now to FIG. 6, illustrated therein is a simplified block diagram of an example machine (or apparatus) 170, which in certain embodiments may be an SDN node, that may be implemented in embodiments described herein. The example machine 170 corresponds to network elements and computing devices that may be deployed in a communications network, such as an SDN node. In particular, FIG. 6 illustrates a block diagram representation of an example form of a machine within which software and hardware cause machine 170 to perform any one or more of the activities or operations discussed herein. As shown in FIG. 6, machine 170 may include a processor 172, a main memory 173, secondary storage 174, a wireless network interface 175, a wired network interface 176, a user interface 177, and a removable media drive 178 including a computer-readable medium 179. A bus 171, such as a system bus and a memory bus, may provide electronic communication between processor 172 and the memory, drives, interfaces, and other components of machine 170.

Processor 172, which may also be referred to as a central processing unit ("CPU"), can include any general or special-purpose processor capable of executing machine readable instructions and performing operations on data as instructed by the machine-readable instructions. Main memory 173 may be directly accessible to processor 172 for accessing machine instructions and may be in the form of random access memory ("RAM") or any type of dynamic storage (e.g., dynamic random access memory ("DRAM")). Secondary storage 174 can be any non-volatile memory such as a hard disk, which is capable of storing electronic data including executable software files. Externally stored electronic data may be provided to computer 170 through one or more removable media drives 178, which may be configured to receive any type of external media such as compact discs ("CDs"), digital video discs ("DVDs"), flash drives, external hard drives, etc.

Wireless and wired network interfaces 175 and 176 can be provided to enable electronic communication between machine 170 and other machines, or nodes. In one example, wireless network interface 175 could include a wireless network controller ("WNIC") with suitable transmitting and receiving components, such as transceivers, for wirelessly communicating within a network. Wired network interface 176 can enable machine 170 to physically connect to a network by a wire line such as an Ethernet cable. Both wireless and wired network interfaces 175 and 176 may be configured to facilitate communications using suitable communication protocols such as, for example, Internet Protocol Suite ("TCP/IP"). Machine 170 is shown with both wireless and wired network interfaces 175 and 176 for illustrative purposes only. While one or more wireless and hardwire interfaces may be provided in machine 170, or externally connected to machine 170, only one connection option is needed to enable connection of machine 170 to a network.

A user interface 177 may be provided in some machines to allow a user to interact with the machine 170. User interface 177 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 178 represents a drive configured to receive any type of external computer-readable media (e.g., computer-readable medium 179). Instructions embodying the activities or functions described herein may be stored on one or more external computer-readable media. Additionally, such instructions may also, or alternatively, reside at least partially within a memory element (e.g., in main memory 173 or cache memory of processor 172) of machine 170 during execution, or within a non-volatile memory element (e.g., secondary storage 174) of machine 170. Accordingly, other memory elements of machine 170 also constitute computer-readable media. Thus, "computer-readable medium" is meant to include any medium that is capable of storing instructions for execution by machine 170 that cause the machine to perform any one or more of the activities disclosed herein.

Not shown in FIG. 6 is additional hardware that may be suitably coupled to processor 172 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 170 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 170 to appropriately manage the operation of the hardware components therein.

The elements, shown and/or described with reference to machine 170, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 173, secondary storage 174, computer-readable medium 179) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 172) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method of dynamically adjusting an amount of bandwidth used for control plane data in a communication link in a network, the method comprising:
    receiving at a network element a transmission control protocol ("TCP") packet with TCP options set on a communication link between a controller and a destination node, wherein the TCP packet is sent by the controller in response to a topology change of the network;
    determining whether or not the network element is a transit node;
    upon determining that the network element is the transit node, comparing a bandwidth value indicated in a TCP options field of the TCP packet with an outgoing link bandwidth of the network element;
    upon determining that the bandwidth value indicated in the TCP options field is greater than the outgoing link bandwidth of the network element, updating the bandwidth value indicated in the TCP options field to be equal to the outgoing link bandwidth of the network element;
    setting a maximum end-to-end bandwidth for the communication link to the bandwidth value indicated in the TCP options field of the TCP packet;
    adjusting an amount of bandwidth available at the network element for control plane data to be a portion of the maximum end-to-end bandwidth;
    processing data plane traffic with a remainder portion of the maximum end-to-end bandwidth that is up to a difference between the portion of the maximum end-to-end bandwidth and the outgoing link bandwidth of the network element; and
    forwarding the TCP packet to a next network element.

2. The method of claim 1, further comprising:
    upon determining that the bandwidth value indicated in the TCP options field is not greater than the outgoing link bandwidth of the network element, refraining from changing the bandwidth value indicated in the TCP options field.

3. The method of claim 1, further comprising:
    upon determining that the network element is the destination node, setting at the destination node the maximum end-to-end bandwidth for the communication link to the bandwidth value indicated in the TCP options field of the TCP packet; and
    sending toward the controller along the communication link a new TCP packet with new TCP options set and having a bandwidth value indicated in a new TCP options field set to equal to an outgoing link bandwidth of the network element.

4. The method of claim 1, wherein the maximum end-to-end bandwidth value is used by the controller to determine an amount of control data to send on the communication link without monopolizing the communication link, wherein the amount of control data is the portion of the maximum end-to-end bandwidth value.

5. The method of claim 1, wherein the network element comprises at least one of a router or a switch.

6. The method of claim 1, further comprising updating the bandwidth value indicated in the TCP options field if congestion is detected on an interface of the network element.

7. The method of claim 1, further comprising determining a maximum reverse end-to-end bandwidth value for one or more network elements in a reverse order from the destination node.

8. One or more non-transitory tangible media that includes code for execution and when executed by a processor is operable to perform operations for dynamically adjusting an amount of bandwidth used for control plane data in a communication link in a network, the operations comprising:
    receiving at a network element a transmission control protocol ("TCP") packet with TCP options set on a communication link between a controller and a destination node, wherein the TCP packet is sent by the controller in response to a topology change of the network;
    determining whether or not the network element is a transit node;
    upon determining that the network element is the transit node, comparing a bandwidth value indicated in a TCP options field of the TCP packet with an outgoing link bandwidth of the network element;
    upon determining that the bandwidth value indicated in the TCP options field is greater than the outgoing link bandwidth of the network element, updating the bandwidth value indicated in the TCP options field to be equal to the outgoing link bandwidth of the network element;
    setting a maximum end-to-end bandwidth for the communication link to the bandwidth value indicated in the TCP options field of the TCP packet;
    adjusting an amount of bandwidth available at the network element for control plane data to be a portion of the maximum end-to-end bandwidth;
    processing data plane traffic with a remainder portion of the maximum end-to-end bandwidth that is up to a difference between the portion of the maximum end-to-end bandwidth and the outgoing link bandwidth of the network element; and
    forwarding the TCP packet to a next network element.

9. The media of claim 8, wherein the operations further comprise:
    upon determining that the bandwidth value indicated in the TCP options field is not greater than the outgoing link bandwidth of the network element, refraining from changing the bandwidth value indicated in the TCP options field.

10. The media of claim 8, wherein the operations further comprise:
    upon determining that the network element is the destination node, setting at the destination node the maximum end-to-end bandwidth for the communication link to the bandwidth value indicated in the TCP options field of the TCP packet; and
    sending toward the controller along the communication link a new TCP packet with new TCP options set and having a bandwidth value indicated in a new TCP options field set to equal to an outgoing link bandwidth of the network element.

11. The media of claim 8, wherein the maximum end-to-end bandwidth value is used by the controller to determine an amount of control data to send on the communication link without monopolizing the communication link, wherein the amount of control data is the portion of the maximum end-to-end bandwidth value.

12. The media of claim 8, wherein the network element comprises at least one of a router or a switch.

13. An apparatus for dynamically adjusting an amount of bandwidth used for control plane data in a communication link in a network, the apparatus comprising:
a memory element configured to store data; and
a processor operable to execute instructions associated with the data;
the apparatus configured for:
receiving at a network element a transmission control protocol ("TCP") packet with TCP options set on a communication link between a controller and a destination node, wherein the TCP packet is sent by the controller in response to a topology change of the network;
determining whether or not the network element is a transit node;
upon determining that the network element is the transit node, comparing a bandwidth value indicated in a TCP options field of the TCP packet with an outgoing link bandwidth of the network element;
upon determining that the bandwidth value indicated in the TCP options field is greater than the outgoing link bandwidth of the network element, updating the bandwidth value indicated in the TCP options field to be equal to the outgoing link bandwidth of the network element;
setting a maximum end-to-end bandwidth for the communication link to the bandwidth value indicated in the TCP options field of the TCP packet;
adjusting an amount of bandwidth available at the network element for control plane data to be a portion of the maximum end-to-end bandwidth;
processing data plane traffic with a remainder portion of the maximum end-to-end bandwidth that is up to a difference between the portion of the maximum end-to-end bandwidth and the outgoing link bandwidth of the network element; and
forwarding the TCP packet to a next network element.

14. The apparatus of claim 13, further configured for:
upon determining that the bandwidth value indicated in the TCP options field is not greater than the outgoing link bandwidth of the network element, refraining from changing the bandwidth value indicated in the TCP options field.

15. The apparatus of claim 13, further configured for:
upon determining that the network element is the destination node, setting at the destination node the maximum end-to-end bandwidth for the communication link to the bandwidth value indicated in the TCP options field of the TCP packet; and
sending toward the controller along the communication link a new TCP packet with new TCP options set and having a bandwidth value indicated in a new TCP options field set to equal to an outgoing link bandwidth of the network element.

16. The apparatus of claim 13, wherein the maximum end-to-end bandwidth value is used by the controller to determine an amount of control data to send on the communication link without monopolizing the communication link, wherein the amount of control data is the portion of the maximum end-to-end bandwidth value.

17. The apparatus of claim 13, wherein the network element comprises at least one of a router or a switch.

18. The media of claim 8, wherein the operations further comprise updating the bandwidth value indicated in the TCP options field if congestion is detected on an interface of the network element.

19. The apparatus of claim 13, further configured for updating the bandwidth value indicated in the TCP options field if congestion is detected on an interface of the network element.

20. The media of claim 8, wherein the operations further comprise determining a maximum reverse end-to-end bandwidth value for one or more network elements in a reverse order from the destination node.

* * * * *